Patented May 26, 1931

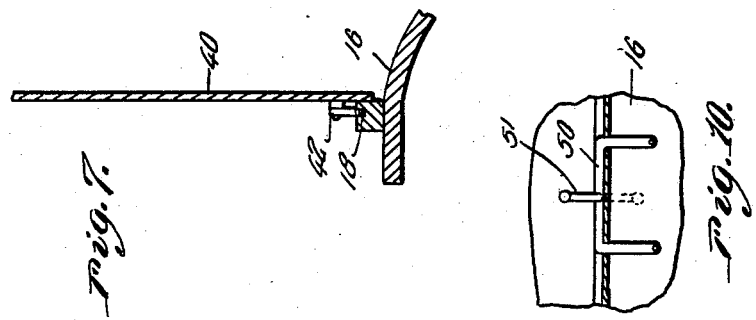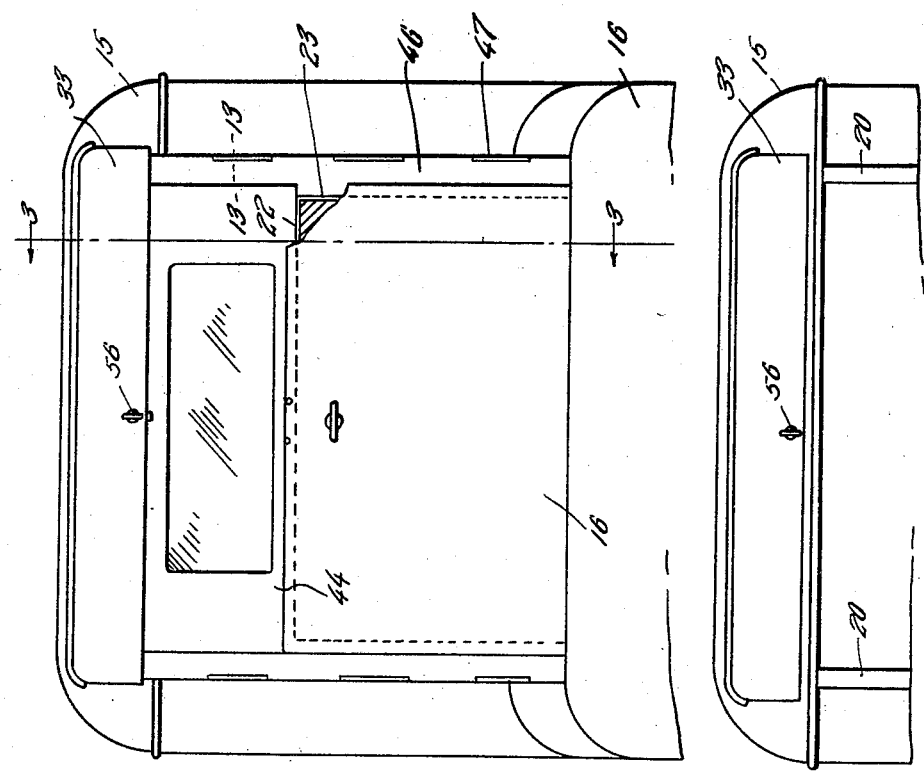

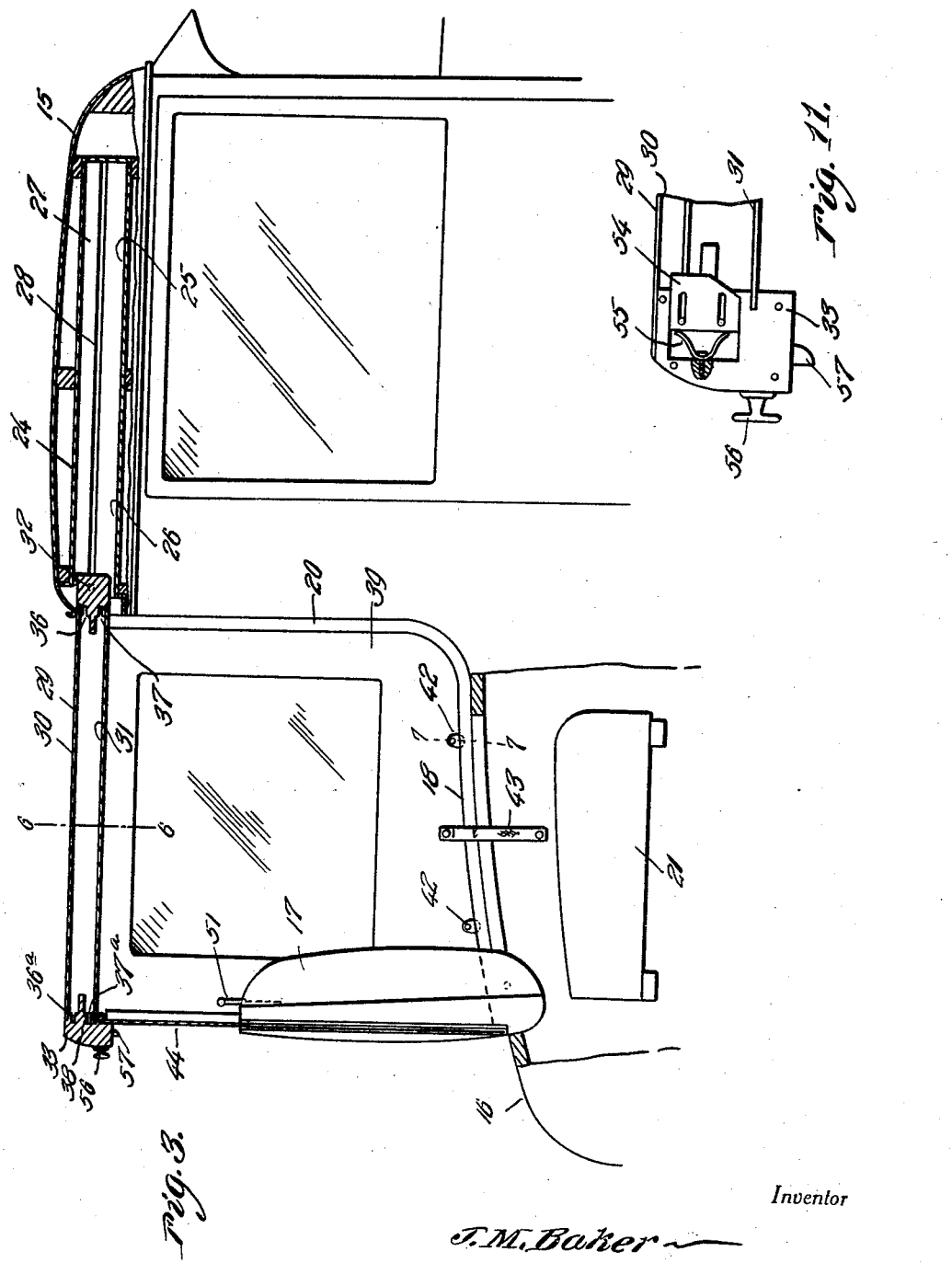

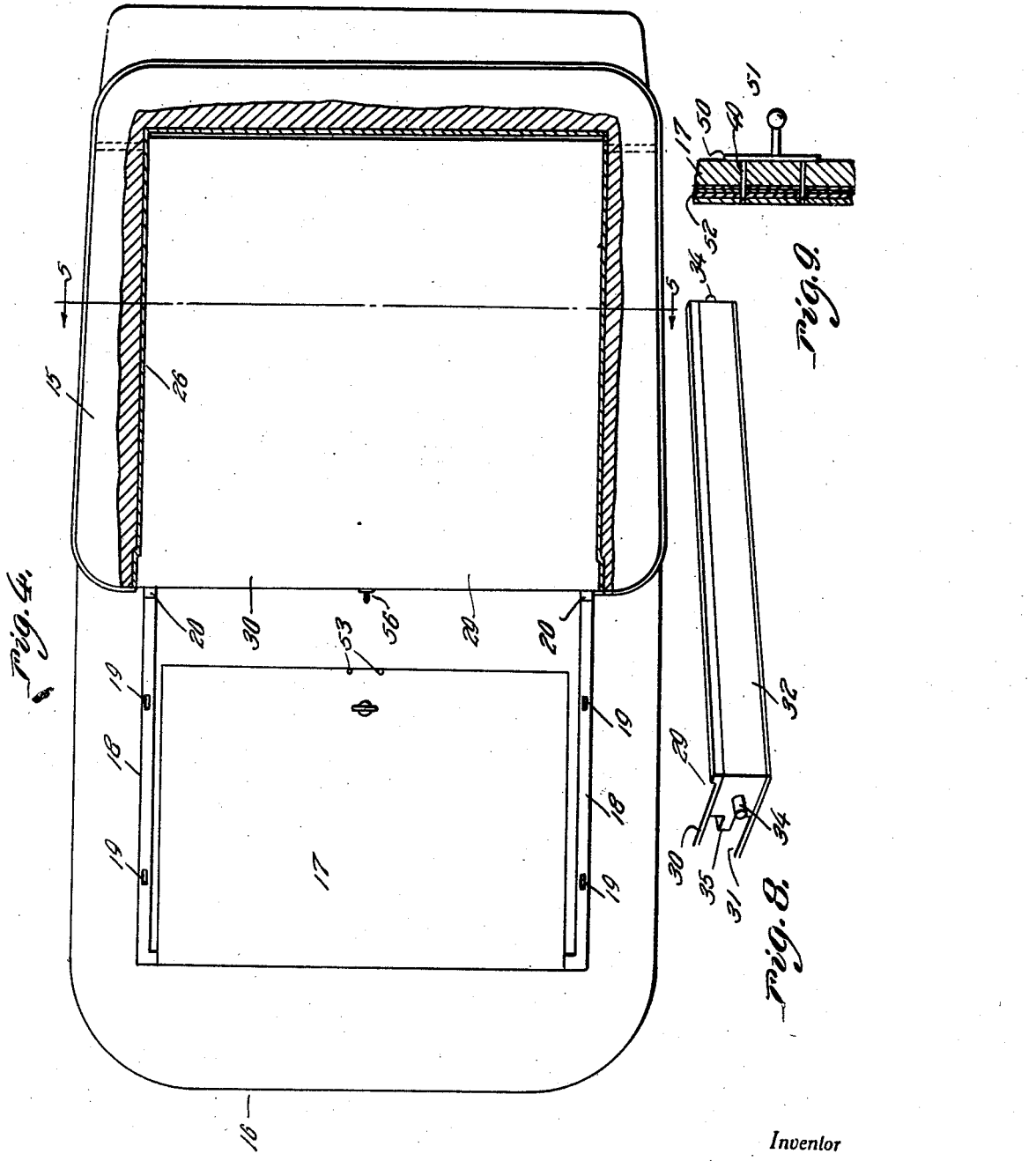

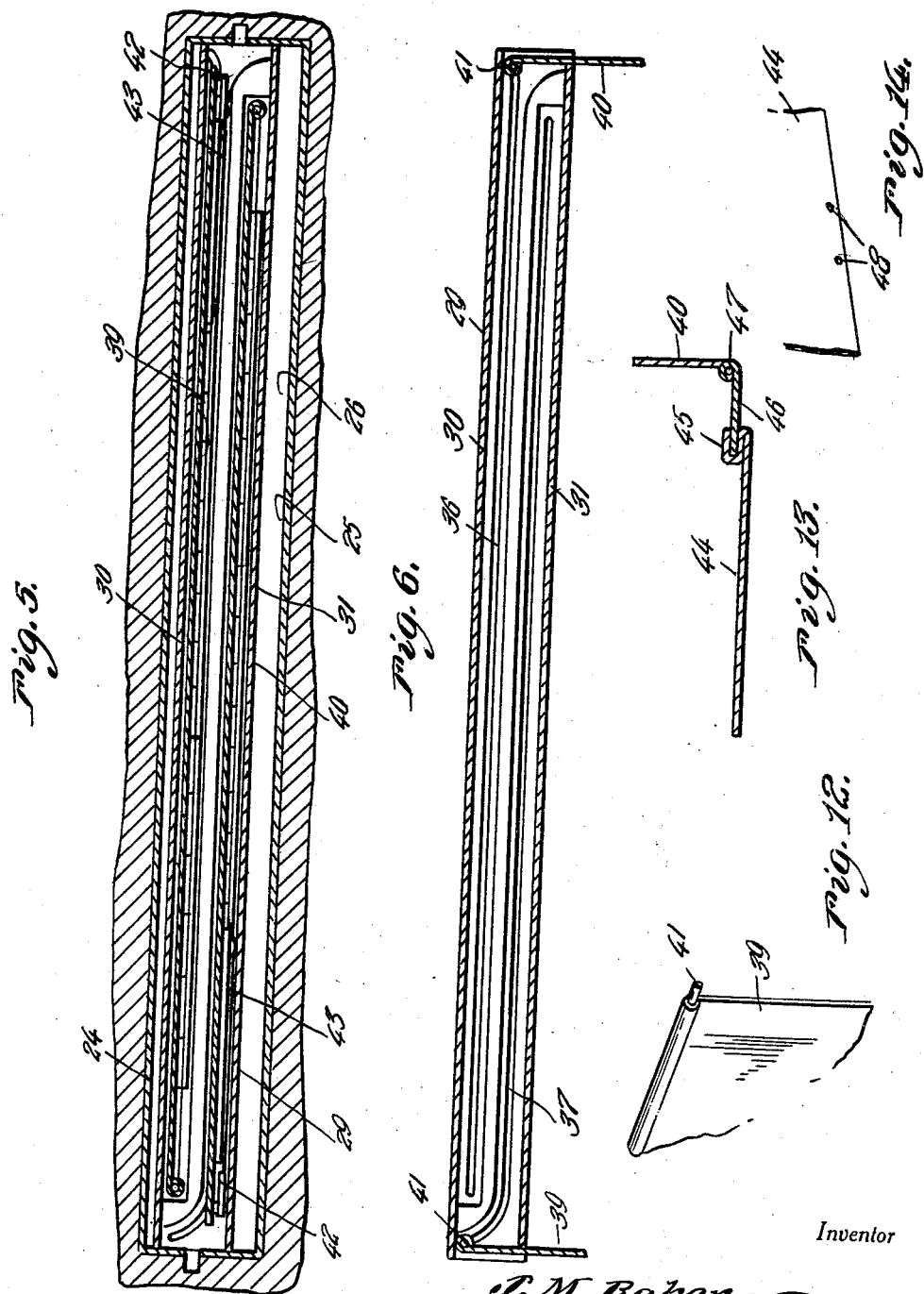

1,806,604

UNITED STATES PATENT OFFICE

JAMES M. BAKER, OF PARKERSBURG, WEST VIRGINIA

COLLAPSIBLE RUMBLE SEAT INCLOSURE

Application filed April 11, 1930. Serial No. 443,484.

This invention relates to a foldable and collapsible structure which is designed to function as an inclosure for a rumble seat such as is provided on certain models of present-day motor vehicles.

In carrying the inventive conception into practice, I have evolved and produced an inclosure which is far more practical than the temporary types of canopies frequently employed for the same general purpose, the present invention being characterized by an extensible and foldable structure, the parts of which when in operative relation form a substantially weather-proof inclosure over and around the rumble seat whereby to afford a dependable occupant-protecting housing, for said seat.

Generally and briefly stated, the primary novelty is predicated upon a simple and economical structure of this class which is characterized by compactness and convenience of arrangement of details, whereby to permit the structure to be shifted to an inclosure-forming state in an expeditious and convenient manner, and to be collapsed and moved to an out-of-the-way position when desired.

The particular structural details and their relative associations and arrangement will become more readily apparent from the following description and drawings.

In the drawings:

Figure 1 is a rear elevational view with a portion shown in section, showing the rumble seat inclosure in an operative state.

Figure 2 is a view with the inclosure folded and slid into the roof container of the main body of the car.

Figure 3 is a sectional view taken approximately on the plane of the line 3—3 of Figure 1.

Figure 4 is a view showing the backrest of the rumble seat swung down to a normal unoccupied condition and the inclosure slid into the pocket-like container or receptacle in the roof of the body of the car, as in Figure 2.

Figure 5 is a section on the line 5—5 of Figure 4.

Figure 6 is a section on the line 6—6 of Figure 3.

Figure 7 is a detail section on the line 7—7 of Figure 3.

Figure 8 is a fragmentary perspective view of the front cross-rail of the extensible roof of the inclosure.

Figure 9 is a detail sectional view of the retaining latch.

Figure 10 is a front elevational view of the latch construction and mounting.

Figure 11 is an end view of the rear or outer rail of the extensible roof detailing, in elevation, a swingable side wall retaining element.

Figure 12 is a fragmentary perspective view of a corner construction of one of the foldable side walls.

Figure 13 is a section on the line 13—13 of Figure 1.

Figure 14 is a fragmentary perspective view of the lower end of the rear wall of the inclosure.

Attention is first invited to Figure 4, wherein the roof of the body portion of the car is designated by the numeral 15, the rear rumble seat part of the body indicated at 16 and the swingable backrest or cover for the rear compartment indicated at 17.

In accordance with the invention I provide a pair of spaced parallel horizontal rails 18 on opposite edges or ends of the backrest 17 and these are formed with longitudinally spaced depressions 19 functioning as keeper seats in a manner to be hereinafter described. These rails 18 include vertical portions 20 as seen in Figure 3 forming shoulders or stops. Also as seen in Figure 3, the numeral 21 designates the rumble seat cushion and in the latter figure, the backrest is shown swung up to an operative position.

In accordance with the present invention, the marginal edges of the frames of the backrest are formed with horizontal or vertical grooves 22 and 23 respectively. In practice, these grooves include rubber packing strips to provide weatherproof joints with the parts of the inclosure which cooperate therewith.

Incidently, the backrest 17 forms the major part of the backwall of the extensible and foldable inclosure for the rumble seat constructions, as seen for example in Figure 1.

Referring now to Figure 3, I call attention to the roof construction of the body of the car which is here shown as formed with a container defined by upper and lower spaced parallel plates 24 and 25 respectively, thus defining a storage compartment as at 26. This compartment also includes side rails 27 having horizontal guide grooves 28.

The complete inclosure, which is of a foldable compact nature, may be slipped into this storage receptacle or space 26 when not in use.

The rumble seat inclosure is characterized by a roof or top construction 29 embodying upper and lower plates 30 and 31 respectively connected with a transverse cross bar 32 at the front and a similar cross bar 33 at the rear. The front cross bar 32 is provided on each of its ends with a cylindrical projection 34 (see Figure 8) which fit into and slide in the grooves 28.

This crossbar is also formed with a central flange-forming ledge as at 35 and further provided with upper and lower grooves 36 and 37. Likewise, the rear bar member is provided with a similar ledge-forming flange 38 and a pair of companion grooves 36a and 37a. This type of extensible roof 29 also functions as a container for the vertical foldable side walls 39 and 40 respectively.

Each side wall is provided with a window and as seen in Figure 12 is provided at its ends with hinge pintles 41 which are slidably mounted in the grooves 36 and 37, and 36a and 37a, whereby to permit the side walls to be telescoped into the roof 29 as seen in Figure 5 when the structure is collapsed and slid into the main storage compartment 26.

By referring to Figure 6, it will be seen that the pintles on the hinged side wall 40 are slipped into the grooves 36 and 36a, whereas those on the side walls 39 slip into the lower grooves 37 and 37a. When in operative position, the walls 40 drop down into the vertical position represented in Figure 6 and rest against the L-shaped shoulder forming rails 18 as seen in Figure 3. Incidently, the numeral 42 designates pivotally mounted retaining cams which swing or snap into the aforesaid keeper notches 19.

As an added retaining means I provide straps 43 having suitable detachable fastening means and these straps are buttoned down as also shown in Figure 3 when the walls 39 and 40 are swung down to an inclosure-forming position.

The numeral 44 designates a relatively short panel hinged at its upper end to the rear wall of the roof 29 and forming the rear wall and this operates in conjunction with the backrest 17 when the latter is in an upright position as represented in Figure 3. Incidently the lower edge of this panel is adapted for reception in the horizontal groove 22 as seen in Figure 1.

The opposite ends of this panel are formed with return bends 45 defining retaining channels along the vertical edges. These retaining channels are adapted to receive flaps 46 hingedly mounted on the rear vertical ends of the side walls. The hinge connections 47 are of appropriate construction.

The flaps 46 are of a length commensurate with the combined height of the panels 44 and the backrest 17. Hence the lower portion of these flaps are received in the vertical grooves 23 as represented in Figure 1, and provides a weatherproof joint.

It will be noticed in Figure 14 that the lower end of the panel 44 is formed with a pair of apertures 48 for reception of retaining fingers 49 carried by the resilient U-shaped latch 15 (see Figure 10) and this latch is provided with a suitable operating knob or handle 51 and is appropriately mounted on the backrest 17.

Incidently in Figure 9, the numeral 52 merely designates the rubber packing means arranged in the horizontal groove. It is to be observed too that the upper or inner edge of the backrest is formed with holes 53 for reception of the retaining fingers 49. Hence, the latch device is such as to permit the fingers to be projected through the holes 48 and into the holes 53 whereby to connect the panel 44 with the grooved upper edge of the backrest of the rumble seat structure.

In Figure 11, the reference numeral 54 designates one of a pair of retaining devices which is suitably constructed for holding the side walls 39 and 40 in a folded position within the roof or container 29. These are in the nature of slidably mounted blocks compressed to a suitable retaining position by suitable spring means 55.

I also direct attention to the knob 56 and the retaining latch bolt 57 forming suitable retaining means for holding the completely folded extensible inclosure in storage position in the space 26. In other words after all of the parts of the inclosure have been folded and the structure slipped into the space 26, the latch 57 comes into play for holding the parts in this position as represented for example in Figure 2.

Under normal running condition, when the rumble seat is not in use, the backrest is swung down to the position seen in Figure 4, at which time it functions as the customary cover or lid for the rear rumble seat compartment 16. At this time, all parts of the extensible inclosure are in a folded state and the complete structure is slipped into the space 26.

By turning the knob 56 and releasing the latch 47, the complete inclosure-forming structure may be withdrawn from the compartment, the panel 44 swung down and seated in the groove 22 as seen in Figure 1, after the backrest 17 has been swung up into position. The latch means 50 is brought into play at this time to hold the panel in position. Thus, the panel and the backrest combined form the rear wall of the compartment.

Then, the retaining devices 54 are pressed inwardly by the thumb of the operator in such a manner as to permit the side walls 39 and 40 to be withdrawn from the roof 29. The side walls are dropped down and locked in place as seen in Figure 3, thus forming a complete weather-proof inclosure around the rumble seat.

It is also understood that the vertical flaps 46 are turned to the position represented in Figure 13, these flaps forming the end portions of the rear wall of the inclosure.

The gist of the invention, it will be understood, is in the provision of a suitable storage space in the roof of the body of the car which is so constructed to accommodate the entire details forming the assembly for making the inclosure around the rumble seat. Particularly do I wish to emphasize the utilization of the back rest of the rumble seat as forming a major part of the backwall of this inclosure, together with the grooves in this backrest and the details co-operating therewith in forming weatherproof joints thereabout.

Moreover, I wish to lay stress on the compactness and convenience of the inclosure which is characterized by the hollow box-like part 29 which functions not only as the roof for the inclosure but as a container for the side walls 39 and 40. Then, too, this part 29 functions as a hanger or a carrier for the rear panel 44.

It is understood, of course, that any suitable retaining means may be provided for co-operation with the various details for holding them in an out-of-the-way position as well as in set position. The hinged mounting of the side walls 39 and 40 together with the pin and groove connections allowing the telescoping action of the side walls into the interior of the roof 29 is of importance.

In carrying the invention into practice, the details may be of any appropriate material or shape, according to the particular model or style of car on which the structure is employed.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. A rumble seat inclosure comprising a roof, a rear panel hinged at its upper end to the rear part of the roof, side panels hingedly connected to the roof, a flap hingedly connected to the rear edge of each side panel and said flaps engaging parts of the rear panel and rumble seat back when the inclosure is in operative position.

2. A rumble seat inclosure comprising a roof, a rear panel hinged at its upper end to the rear part of the roof, side panels hingedly connected to the roof, a flap hingedly connected to the rear edge of said side panel, the rear panel being grooved to receive the edges of the flaps and latch means for connecting the rear end of the rear panel to the back of the rumble seat back.

3. A rumble seat inclosure comprising a roof, a rear panel hinged at its upper end to the rear part of the roof, side panels hingedly connected to the roof, a flap hingedly connected to the rear edge of each side panel, the rear panel having side grooves therein to receive edges of the flaps and the rumble seat back having grooves therein to receive edges of the flaps and said rear panel.

In testimony whereof I affix my signature.

JAMES M. BAKER.